(12) United States Patent
Xu et al.

(10) Patent No.: US 11,334,518 B2
(45) Date of Patent: May 17, 2022

(54) EMBEDDED FILE NETWORK SERVER BASED ON SEISMIC DATA STREAM

(71) Applicant: INSTITUTE OF GEOLOGY AND GEOPHYSICS, THE CHINESE ACADEMY OF SCIENCES, Beijing (CN)

(72) Inventors: Qing Xu, Beijing (CN); Tianyao Hao, Beijing (CN); Yuan Wang, Beijing (CN); Chunlei Zhao, Beijing (CN); Yan Zhang, Beijing (CN)

(73) Assignee: INSTITUTE OF GEOLOGY AND GEOPHYSICS, THE CHINESE ACADEMY OF SCIENCES, Beijing (CN)

( * ) Notice: Subject to any disclaimer, the term of this patent is extended or adjusted under 35 U.S.C. 154(b) by 85 days.

(21) Appl. No.: 17/060,010

(22) Filed: Sep. 30, 2020

(65) Prior Publication Data

US 2021/0349846 A1 Nov. 11, 2021

Related U.S. Application Data (63) Continuation of application No. PCT/CN2020/089530, filed on May 11, 2020.

(51) Int. Cl.
*G06F 13/42* (2006.01)
*G01V 1/22* (2006.01)
(Continued)

(52) U.S. Cl.
CPC ............ *G06F 13/4286* (2013.01); *G01V 1/22* (2013.01); *G01V 1/24* (2013.01); *G04R 20/02* (2013.01);
(Continued)

(58) Field of Classification Search
CPC .............. G04R 20/02; H04L 29/08027; H04L 29/08036; H04L 29/08117; G01V 1/247;
(Continued)

(56) References Cited

U.S. PATENT DOCUMENTS

| 2008/0307240 | A1* | 12/2008 | Dahan | G06F 1/324 |
| | | | | 713/320 |
| 2011/0145459 | A1* | 6/2011 | Conti | G06F 13/24 |
| | | | | 710/261 |

(Continued)

FOREIGN PATENT DOCUMENTS

| CN | 105158793 A | 12/2015 |
| CN | 109031406 A | 12/2018 |

(Continued)

OTHER PUBLICATIONS

International Search Report issued in corresponding International application No. PCT/CN2020/089530, dated Jan. 27, 2021.

(Continued)

*Primary Examiner* — Christopher M Crutchfield
*Assistant Examiner* — Jean F Voltaire (57) ABSTRACT

An embedded file network server based on a seismic data stream includes a broadband power management module, a main control unit, a serial-port-to-RS232 module, a PHY bridge layer, an SD card, and a network interface. The main control unit includes serial port, an SDIO interface, an internal RAM, DMA units, and a MAC drive layer. The main control unit performs seismic data interaction with an external device through the serial port, and receives seismic data through an internal interruption, and the received seismic data stream is stored in the internal RAM. The internal RAM transfers the received seismic data stream to the SDIO interface and MAC driver layer through the DMA units. The SDIO interface stores the seismic data stream in the SD card for data backup. The MAC driver layer is coupled to the (Continued)

PHY bridge layer for inputting and outputting the seismic data stream.

20 Claims, 2 Drawing Sheets

(51) Int. Cl.
    *G04R 20/02*     (2013.01)
    *H04L 69/324*     (2022.01)
    *H04L 69/325*     (2022.01)
    *G06F 13/40*     (2006.01)
    *G01V 1/24*     (2006.01)
    *H04L 67/06*     (2022.01)

(52) U.S. Cl.
    CPC ...... *G06F 13/4027* (2013.01); *G06F 13/4226* (2013.01); *G06F 13/4291* (2013.01); *H04L 29/08027* (2013.01); *H04L 29/08036* (2013.01); *H04L 29/08117* (2013.01)

(58) Field of Classification Search
    CPC ........ G01V 1/24; G01V 1/22; G06F 13/4226; G06F 13/4286; G06F 13/4291; G06F 13/4027
    USPC .......................................................... 370/219
    See application file for complete search history.

(56) References Cited

U.S. PATENT DOCUMENTS

2018/0232036 A1*   8/2018   Varadarajan .......... G06F 1/3209
2018/0279221 A1*   9/2018   Fuleshwar Prasad ......................
                                                  H04W 52/0254
2020/0150734 A1*   5/2020   Ma ........................ G06F 1/3243

FOREIGN PATENT DOCUMENTS

CN           111123353 U     5/2020
WO       2019001210 A1     1/2019

OTHER PUBLICATIONS

Written Opinion of the International Searching Authority for No. PCT/CN2020/089530.

* cited by examiner

EMBEDDED FILE NETWORK SERVER BASED ON SEISMIC DATA STREAM

CROSS-REFERENCE TO RELATED APPLICATIONS

The present application is a continuation of International Patent Application Number PCT/CN2020/089530, filed on May 11, 2020, the entire contents of which are incorporated herein by reference in their entireties.

TECHNICAL FIELD

The present application relates to the technical field of geophysical surveying, and more particularly relates to an embedded file network server based on a seismic data stream.

BACKGROUND

Seismic signals in different frequency bands carry different formation information. Because high-frequency signals decay relatively fast after traversing the formation, the depth of the formation that can be inverted for is relatively shallow. Therefore, for engineering seismic observations and natural seismic observations, the sampling frequency does not need to be very high, usually below 1000 HZ. For special application scenarios of seismic observation, the data streams are typically below 32000 bps, so a corresponding serial port or SPI port (Serial Peripheral Interface) may be used for data flow communication between each other. However, for all kinds of seismic acquisition equipment used on land or seabed, although they can accomplish data acquisition per se, they lack a corresponding file network module that can convert their data streams into a file that can be communicated to a remote network server. As a result, their data streams are restricted to the state of local storage.

Regarding the deficiencies of the above-mentioned various kinds of seismic acquisition equipment, although the hardware for accomplishing the above-mentioned remote network transmission function can be developed separately, the hardware and the entire equipment are in a highly integrated state, making it not easy for assembly and disassembly. Furthermore, when the user does not need this function, it can easily cause waste of the hardware thus resulting in increased costs. In addition, development costs are also increased for manufacturers of the seismic acquisition equipment, and various deviations in understanding of the protocol may occur during the development process, causing problems such as abnormal data stream transmission.

SUMMARY

The present application provides an embedded file network server based on a seismic data stream, which aims to solve one of the above technical problems in the related art at least to a certain extent.

In order to solve the above problems, this application provides the following technical solutions.

The technical solution adopted in the embodiments of the present application further includes an embedded file network server based on a seismic data stream, which includes a broadband power management module, a main control unit, a serial-port-to-RS232 module, a PHY bridge layer, an SD card, and a network interface.

One end of the broadband power management module is coupled to an external power supply, and the other end is coupled to the main control unit. The broadband power management module is used for rectifying and processing the power input and providing an electric level for the main control unit.

The main control unit may include a serial port, a SDIO interface, an internal RAM, DMA units, and a MAC driver layer. The serial port is coupled to the serial-port-to-RS232 module. The internal RAM is coupled to the SDIO interface and the MAC driver layer through the DMA units, respectively. The SDIO interface is coupled to the SD card. The MAC driver layer is coupled to the PHY bridge layer. The PHY bridge layer is coupled to the network interface.

The main control unit may perform seismic data interaction with an external device through the serial port, and receive seismic data through an internal interruption, and the received seismic data stream is stored in the internal RAM. The internal RAM transfer the received seismic data streams to the SDIO interface and the MAC driver layer through the DMA units, and the SDIO interface stores the seismic data stream into the SD card for data backup. The MAC driver layer is coupled to the PHY bridge layer to input and output seismic data streams.

The technical solutions adopted in the embodiments of the present application further include the following. The broadband power management module may include built-in boost and buck modules, which use a CMOS logic gate circuit. When recognizing that the external power supply voltage is lower than a set voltage threshold, the CMOS logic gate circuit is turned off, and the boost module is activated to step up the voltage. When recognizing that the external power supply voltage is higher than the set voltage threshold, then the CMOS logic gate circuit is turned on, and the buck module is activated to step down the voltage.

The technical solutions adopted in the embodiments of the present application further include the following. The server further may include a crystal oscillator, and the main control unit may further include a PLL frequency multiplier coupled to the crystal oscillator. The PLL frequency multiplier is used to perform a frequency multiplication operation on the crystal oscillator.

The technical solutions adopted in the embodiments of the present application further include the following. The main control unit may adopt a cortex chip, and the crystal oscillator may adopt a crystal oscillator with a main frequency of 22.288 m. The PLL frequency multiplier may perform an 8-times frequency multiplication operation on the crystal oscillator, and the 96M main frequency is adopted after passing through the PLL frequency multiplier.

The technical solutions adopted in the embodiment of the present application may further include the following. The main control unit may further include an SPI interface, and the serial port may further include a serial port configuration register, a serial port interrupt register, and a serial port data register, which are used to flexibly configure the serial port baud rate and receive data in an interrupt mode. The SPI interface may further include an SPI configuration register and an SPI data register, which are used for data reception and data stream operation by the SPI.

The technical solutions adopted in the embodiments of the present application may further include the following. The SDIO interface may perform data communication with the SD card in a four-wire mode to realize the establishment and mounting of the SD card file system.

The technical solutions adopted in the embodiments of the present application may further include the following. The DMA units may have dual-channel DMA transmission capability, thereby realizing automatic triggering of multi-channel data transmission from the serial port to the SDIO unit, from the internal RAM to the MAC driver layer, and from the internal RAM to the SDIO unit.

The technical solutions adopted in the embodiments of the present application may further include the following. The embedded file network server may be built in with two sets of packaging protocol rules, which can automatically identify the network protocol. When the data stream received through the serial port is interrupted, the serial data is received and packaged in different data stream formats during the interruption. After packaging, the serial data is transmitted depending on the registration status of each seismic acquisition server, thereby transmitting the seismic data stream to the corresponding seismic acquisition server.

The technical solutions adopted in the embodiments of the present application may further include the following. The embedded file network server also may include a built-in GPS module, which uses a GPS-based real-time clock tame mechanism to accurately time and correct the internal clock. Specifically, it is first determined whether the GPS time is locked.

Thereafter, the GPS timing filtering algorithm is used to perform PPS screening. After the screening, the effective PPS is timed. For the subsequent crystal drift phenomenon, the real-time clock correction algorithm is applied to perform real-time correction of the crystal drift deviation.

Compared with the related art, embodiments of the present application may provide the following benefits. The embedded file network server based on a seismic data stream according to the embodiments of the present application includes a main control unit and other peripheral unit modules. The seismic data stream is automatically converted into a file record and mapped as a remote network file server, or the data stream may be transmitted to the remote network server through a data link port. This application uses a simple interface and adopts a one-way communication mode, which can avoid the problem of protocol network access debugging. It can be embedded in various seismic collectors such as onshore seismic collectors or seabed seismic collectors to realize the conversion between data streams and remote network file servers or send the data streams to remote seismic network servers according to the network protocol, thus reducing the complexity of development of the seismic collectors, saving the time required for development, reducing user hardware costs, and achieving rapid network access for the equipment. In addition, while sending the data stream to the remote server, the data stream can be stored as a local file for data backup to ensure that the collected information can be saved to the maximum extent in case the main collection device fails.

DETAILED DESCRIPTION

For a better understanding of the objectives, technical solutions, and advantages of the present application, hereinafter this application will be described in further detail in connection with the accompanying drawings and embodiments. It will be appreciated that the specific embodiments described herein are merely illustrative of the application and are not intended to limit the application.

Figure 1:
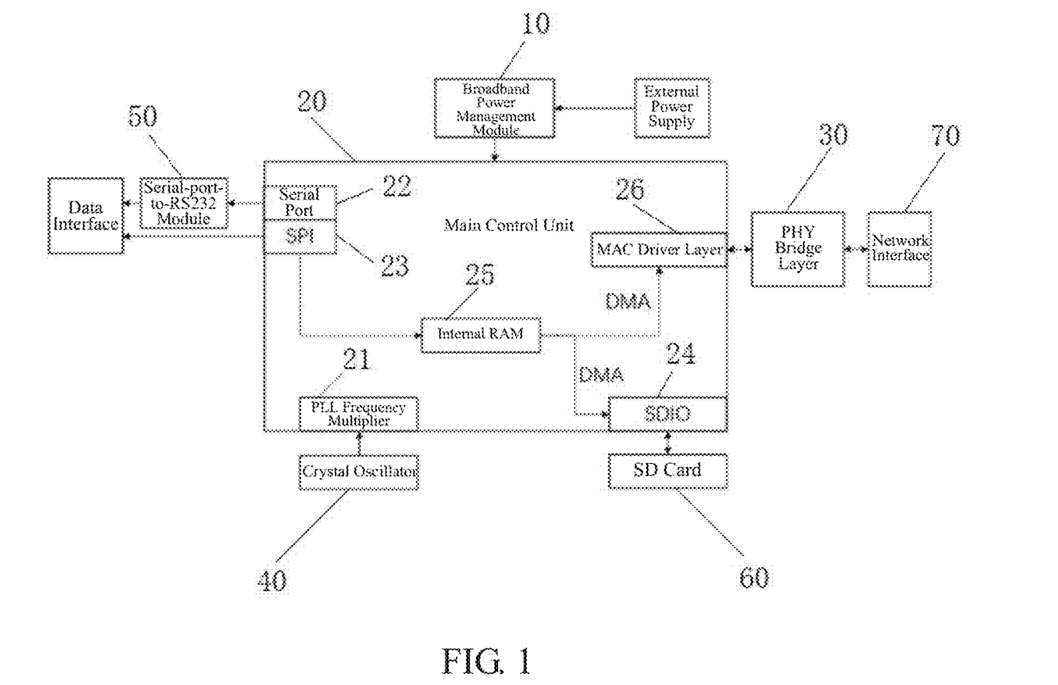
FIG. 1 is a schematic diagram illustrating the hardware structure of an embedded file network server based on a seismic data stream according to an embodiment of the present disclosure.

FIG. 1 is a schematic diagram illustrating the hardware structure of an embedded file network server based on a seismic data stream according to an embodiment of the present disclosure. The embedded file network server based on a seismic data stream in this embodiment of the present application includes a broadband power management module 10, a main control unit 20, a PHY (Physical, port physical layer) bridge layer 30, a crystal oscillator 40, a serial-port-to-RS232 module 50, an SD card 60, and a network interface 70. One end of the broadband power management module 10 is coupled to an external power supply, and the other end is coupled to the main control unit 20. The main control unit 20 includes a PLL (Phase Locked Loop) frequency multiplier 21, a serial port 22, a SPI (Serial Peripheral Interface) interface 23, a SDIO (Secure Digital Input and Output) interface 24, an internal RAM (Random Access Memory) 25, a MAC driver layer 26, a DMA (Direct Memory Access) unit (not shown), and an SDRAM (synchronous dynamic random-access memory) unit (not shown). The PLL frequency multiplier 21 is coupled to the crystal oscillator 40. The serial port 22 is coupled to the serial-port-to-RS232 module 50. The serial-port-to-RS232 module 50 is coupled to a data interface. The SDIO interface 24 is coupled to the SD card 60. The internal RAM 25 is coupled to the SPI interface 23, and coupled to each of the SDIO interface 24 and the MAC driver layer 26 through a DMA. The SPI interface 23 is coupled to a data interface. The MAC drive layer 26 is coupled to the PHY bridge layer 30. The PHY bridge layer 30 is coupled to the external network interface 70.

Specifically, the broadband power management module 10 is used to rectify and process the entire power input to provide the necessary level support for the main control unit. The broadband power management module 10 may have built-in boost and buck modules (not shown), which automatically recognize the external 3V-24V power supply voltage and automatically perform the voltage step-up or step-down operation to make it reach the operating electric level of the instrument. Specifically, when it is recognized that the external power supply voltage is lower than the set voltage threshold (in this embodiment of the present application, the voltage threshold is set to 5 v as an example, the specific voltage value can be set depending on actual operation), the boost module may be automatically activated to boost the voltage to reach the operating electric level of the instrument. When it is recognized that the external power supply voltage is higher than the set voltage threshold, then the buck module may be automatically started to buck the voltage to make it reach the operating electric level of the instrument. The power management hardware circuit of the broadband power management module 10 may use an automatic recognition circuit, and no time delay is entailed for mode switching, thus increasing the practicality of the instrument.

In this embodiment of the present application, the boost and buck modules use CMOS logic gate circuits. When the input voltage is low, the CMOS logic gate circuit is turned off so that the boost module is started. The boost module uses the DCDCLM2577 module to realize the voltage conversion from low electric level to high electric level, with its input lying in the range of 3 to 5V, and the output electric level range being 9V. When the input voltage is high, the CMOS logic gate circuit is turned on, and at this time the buck module is started, which uses the MP184 to realize various voltage outputs by adjusting its subsequent matching resistance. The LM2577 and MP184 of the CMOS logic gate circuit are not intended as limiting examples, and the optimal solution can be selected depending on its own circuit to realize its power supply step-up and step-down management, and the n-type filter may be subsequently added to filter out the ripples and inrush currents, to achieve stable and effective electric level.

In this embodiment of the present application, the main control unit 20 uses a cortex chip, and performs a frequency multiplication operation on the crystal oscillator 40 through the PLL frequency multiplier 21, and interacts with an external device through the serial port 22 or the SPI interface 23 to exchange seismic data. In particular, it receives the seismic data through internal interruption, and the received seismic data stream is stored in internal RAM25 for buffering, and the internal buffer uses double buffering. The internal RAM 25 transmits the received seismic data stream to the SDIO interface 24 and the MAC driver layer 26 through the DMA units. The SDIO interface 24 stores the seismic data stream in the external SD card 60 for data backup. The external USB interface is coupled to the USB drive through SDIO to realize the external reading of the data stored in the SD card. The MAC driver layer 26 is coupled to the external PHY bridge layer 30 to realize the input and output of the seismic data stream. After receiving the seismic data stream, the MCU packages it according to the seismic network format and sends the packaged data to the seismic network server. The MCU may have a built-in FTP server, which is used to package the file system to facilitate users to remotely delete, download, and change the files.

Further, the PLL frequency multiplier 21 may perform an 8-fold frequency multiplication operation on the crystal oscillator 40, where the specific parameters may be set depending on the actual operations. The crystal oscillator 40 may use a crystal oscillator with a main frequency of 22.288 m. This crystal oscillator may be used in combination with the PLL frequency multiplier 21 to achieve effective frequency division and frequency multiplication operations, thereby obtaining a higher operating frequency and ensuring a stable operating performance. It also provides a vibration source for other circuits, with a clock accuracy of 1 ppm, and can be used together with the following GPS clock calibration procedure, thereby achieving high clock time accuracy and saving the hardware costs. The chip main frequency adopts 96M main frequency after passing through PLL frequency multiplier 21.

In some embodiments, the serial port 22 may further include a serial port configuration register (not shown), a serial port interrupt register (not shown), and a serial data register (not shown), which can flexibly configure the serial port baud rate and implement data reception in an interrupt manner. The frequency division value of the serial port baud rate register can be flexibly set, thereby providing a basis for the subsequent dynamic identification of the serial port baud rate. The SPI interface 23 may further include a SPI configuration register and a SPI data register, which can implement data reception and data streaming operations of the SPI.

Further, in some embodiments, the SDIO interface 24 may perform data communication with the SD card 60 through a four-wire mode, so as to realize the establishment and mounting of the SD card file system.

Further, in some embodiments, the DMA units may have dual-channel DMA transmission capability, which can achieve the data transmission from memory to peripherals and from peripherals to memory, thereby providing conditions required for subsequent DMA transmission algorithms.

Further, in some embodiments, the memory size required by the SDRAM unit for implementing its algorithm is at least 64 k, which can guarantee the memory space required for data operation, the space required for the stack, and the space required for DMA data transmission.

Further, in some embodiments, the PHY bridge layer 30 may use the dp83848 chip, which can cooperate with the MAC driver layer 26 of the main control unit 20 to complete the construction of the entire network hardware. The network interface 70 may include an RJ45 network interface to achieve the final set-up of network hardware. The MAC driver layer may include various registers of various network configurations and various registers that are bridged with the PHY bridge layer 30, and implement the transmission and packaging of network protocols.

In this embodiment of the present application, the embedded file network server adopts an innovative adaptive baud rate recognition scheme, which can recognize the standard baud rate of the serial port and can automatically recognize the customized baud rate of the serial port.

The recognition scheme uses a software recognition scheme, without the need to add two wires CTS and RTS, thereby reducing hardware costs. Specifically, the principle of adaptive baud rate recognition is as follows. Based on the information entropy theory, the effective characters will inevitably appear within a certain time, corresponding to the serial communication protocol, the first bit is the start bit, which is a low level, and it must have a falling edge that transitions from high level to low level. The last stop bit is set to high level, and at this time there must be a high-low level transition for the valid data bits before the stop bit. Therefore, under certain data flow conditions, a low level will inevitably occur, and its rising edge can be detected at this time, so its implementation is to recognize and record the first falling edge of each character frame through software and the last rising edge of the same character frame and count the received valid data stream. The counting duration is 1 second, and then the maximum time interval obtained by the counting is 10 times the baud rate of the data stream. Therefore, the baud rate can be calculated and the serial port baud rate is automatically recognized.

Figure 2:
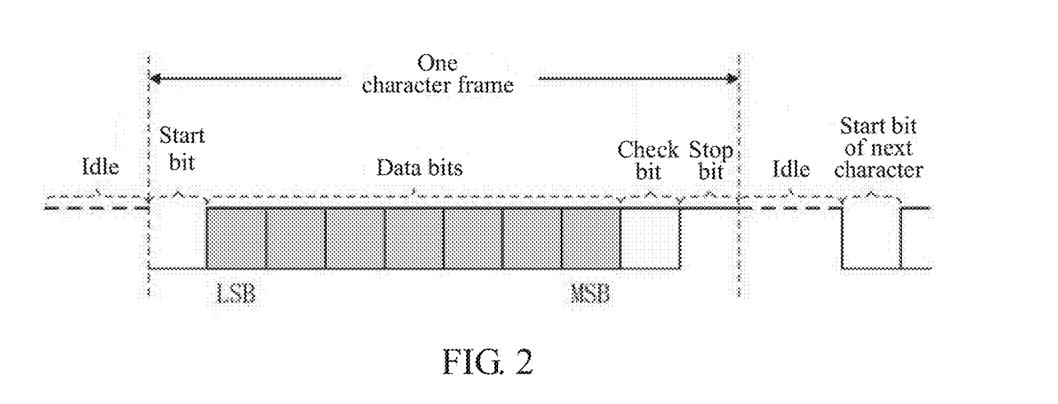
FIG. 2 is a schematic diagram illustrating an adaptive baud rate algorithm of an embedded file network server based on a seismic data stream according to an embodiment of the present application.

Referring further to FIG. 2, which shows a schematic diagram illustrating an adaptive baud rate algorithm of an embedded file network server based on a seismic data stream according to an embodiment of the present application. The adaptive baud rate algorithm specifically includes: 1) Set the corresponding pin that is originally serial input to GPIO input, and set it to the falling edge capture mode, and connect it to the capture function register of TIMER; 2) Enable the capture interrupt function of TIMER to capture the frequency division value of its falling edge; 3) In the TIMER interrupt function, store the falling edge capture value in the variable CR0; 4) Set the capture interrupt to change from falling edge interrupt enabled to rising edge interrupt enabled, and turn on the rising edge interrupt at the same time; 5) wait for the trigger of the rising edge interrupt at this time, and store the rising edge capture value in the register CR1 after the trigger; 6) calculate the single-time bps value, where the formula for calculating the bps is: bps=(CR0−CR1)/PCLK/10, where in this formula, PCLK is the MR0 value of timer TIMER, MR0 value is its oscillation frequency after frequency division, because a stop bit and a start bit and 8 bits are required, so the bps value needs to be divided by 10; 7) repeatedly execute steps 1) to 6), count all bps values within 2 s, and select the maximum value of bps, which is the adaptive bps value of the serial port. In this algorithm, it should be noted that the time of the interruption from falling edge to rising edge should be less than 1 bps, otherwise it will cause statistical error.

In this embodiment of the present application, the embedded file network server can be embedded in various seismic collection servers. The main control unit 20 internally performs data transfer based on DMA and does not occupy CPU memory. The internal data stream transmission includes multiple DMA channels, and can realize automatic triggering of multi-channel data transmission from serial port to SDIO, from internal RAM to MAC driver layer, and from internal RAM to SDIO. Specifically, the multi-channel DMA simultaneous trigger mode is used. It is divided into two DMA buses, which do not interfere with each other from both sides of the AHB bus. In addition, the DMA data stream from the serial port to SDIO is automatically triggered by the serial port register, and data migration is automatically realized after the trigger, thereby saving the MCU software and hardware resources to the largest extent. In addition, because the data needs to be packaged and protocol collated, the second DMA directly reaches the network MAC layer register from the MCU memory, and then the data is directly transferred from the MAC layer to the physical layer, thus achieving high-speed transmission of network data, giving full play to the advantages of network cards. Compared with other published algorithms and architectures, this architecture can realize high-speed data processing and network card streaming operations, allowing users to choose MCUs with lower main frequencies or lower prices depending on this architecture.

Further, the implementation of the multi-DMA channel parallel data stream processing may specifically include the following. Selecting an AHB bus data stream, of which the input source is set to a serial data register RX, and the destination is the SDIO data register. The trigger source is selected as the serial port data register RX, and the trigger threshold is set to 26 bit.

When the serial port data reaches 26 bits, the DMA transfer is automatically triggered, and the DMA can use the AHB1 and AHB2 buses without occupying internal RAM. For another DMA channel, the input source is the internal RAM, the destination is set to the MAC data register, the trigger source is set to TIMER4, where the TIMER4 regularly checks the memory data, and the trigger threshold is set to 522B. If the memory data is greater than this value, then this DMA data stream would be triggered by the TIMER, thereby realizing the automatic transfer from the internal RAM to the MAC layer. These two DMAs use DMA1 and DMA2 of the MCU respectively, and these two channels of DMA do not interfere with each other. Since the memory cannot be used as the trigger source condition, TIMER2 is selected as the trigger source of the DMA. TIMER2 as the trigger method can greatly save the internal computing time of the MCU and reduce the memory usage. For other embedded MCUs, the type selection requirement is the existence of a dual-channel DMA capability, and the DMA channels can be operated by both the AHB1 and AHB2 buses.

In this embodiment of the present application, the embedded file network server can implement data packaging, and then transmit the data stream to a variety of seismic collection servers such as the China Seismic Network Server or a real-time transmission seismic server. The embedded file network server is built in with two sets of packaging protocol rules, which can automatically identify the seismic network protocol, and then transfer the data stream to different servers. The data stream automatic recognition mechanism is specifically as follows. First turn on and initialize the tcp socket as a tcp client, and start two data streams. For the client of data stream 1, first initiate a connection to the fixed port 1973, then initiate a registration to the seismic network server, and wait for the response of a registration packet. If the response packet is received within a specified time period, it will be marked as a successful registration, and so the data packets may then be sent to the network server. At the same time, for the client of the data stream 2, initiate a connection to the port 5000 of the real-time transmission seismic server. After the connection is successful, send a registration instruction may to it, and enter the data stream sending status after the registration is successful. When a data stream interrupt of the serial port is received, the serial data is received and packaged in different data stream formats during the interruption. After packaging, the data is transmitted depending on the registrations of the two. If the registration is successful, the data stream may be sent. If both data streams are successfully registered, then they may be sent simultaneously, so that both automatic data stream recognition and simultaneous data stream transmission can be achieved.

In this embodiment of the present application, the embedded file network server may further have a built-in GPS module (not shown). The GPS module uses the GPS-based real-time clock tame mechanism to accurately time and correct the internal clock. The GPS module may receive signals and time the entire system, and the embedded file network server can have a high-precision time system, and so can add a valid time stamp bit in the input data when only the serial port data stream is received and there is no valid time stamp in the data stream, thereby further simplifying the cost of using the input body. Especially for seismic collectors that do not have an effective time system or have low time accuracy, it can effectively supplement their time calibration, thereby broadening their application scenarios and scope of use. Specifically, the internal time calibration mechanism is as follows. First determine whether the GPS time is locked, and use the GPS timing filtering algorithm T1 to perform PPS screening after the determination, and time the effective PPS after screening. For the subsequent crystal drift phenomenon, real-time calibration using the clock real-time correction algorithm T2 can effectively offset the oscillation deviation of the crystal due to temperature and aging.

Further, the specific implementation of the GPS timing screening algorithm T1 is as follows.

State 1: First analyze the GPRMC statement to determine whether the time flag is valid. If it is valid, enter State 2; otherwise, wait in State 1.

State 2: Analyze the GPRMC statement to determine whether the position information lock is valid. If it is valid, enter State 3, otherwise wait in State 2.

State 3: Preliminarily determine the initial stability of the GPS output pulse. Set the stability judgement counter Cont1, increment Cont1 by one each time the timer 1 capture unit Cpt captures the pulse rising edge PPS, and enter State 4 when Cont1 is equal to 20.

State 4: Correct the counter vibration base value. Set the capture counter Cont2, where this value is incremented by one when the timer 1 capture unit Cpt captures PPS. Set the on-capturing timer 1 vibration value Tm1, where this value is equal to the timer vibration value captured by the timer capture unit at the rising edge of the PPS. Set the capture timer 1 vibration accumulated value Sum, which is equal to the accumulated sum of Tm1 before the capture time point. At the initial time, Cont2 is cleared, Tm1 is cleared, and Sum is cleared. When capturing the first PPS, determine whether Tm1 is greater than half of the crystal's nominal value and less than 1.5 times the crystal's nominal value. If Tm1 is not greater than half of the crystal's nominal value and less than 1.5 times the crystal's nominal value, it means that the PPS is unstable, then clear Cont2, Tm1, Sum, and restart the count. Otherwise, it means that the PPS is normal, and Cont2 is increased by one and the value of Cont2 is added to Sum, and the process continues. When Cont2 is equal to 256, the Sum is shifted to the right by 8 bits as the vibration base value TA of the counter 1, and the state 5 is entered.

State 5: Start the counter timing. Counter 1 waits for the arrival of PPS, time the GPS time to the time variable array when PPS arrives and reset and start the counter. The counter performs timing synchronization. Set counter 1 to carry interrupt. When the number of vibrations of the counter 1 is equal to the vibration base value TA calculated in state 4, set it to generate a carry second interrupt, and the time array is carried to the second, thereby completing the timing. After the timing is completed, the time at any time within the instrument can be obtained by reading the time array, and the time information within the second can be obtained by reading the vibration value TB at a single time of the timer divided by the crystal base value TA.

In this embodiment of the present application, the implementation of the GPS-based clock real-time correction algorithm T2 is specifically as follows. After the timing of the instrument is completed, the timer 1 capture unit Cpt continues to capture the PPS signal produced by the GPS, and the vibration value TB of the timer 1 captured at this time is recorded as Tm2, and a determination is performed regarding Tm2. If Tm2 is less than half of the crystal oscillator TA at this time, then the timer 1 has just completed the second interrupt carry operation, at this time the counter vibration value TB is cleared and reset. If Tm2 is greater than half of the crystal oscillator TA at this time, then the timer has not carried out the carry second interrupt carry operation at this time, and then the time data is performed with the second carry operation and then the counter vibration value TB is cleared and reset.

Figure 3:
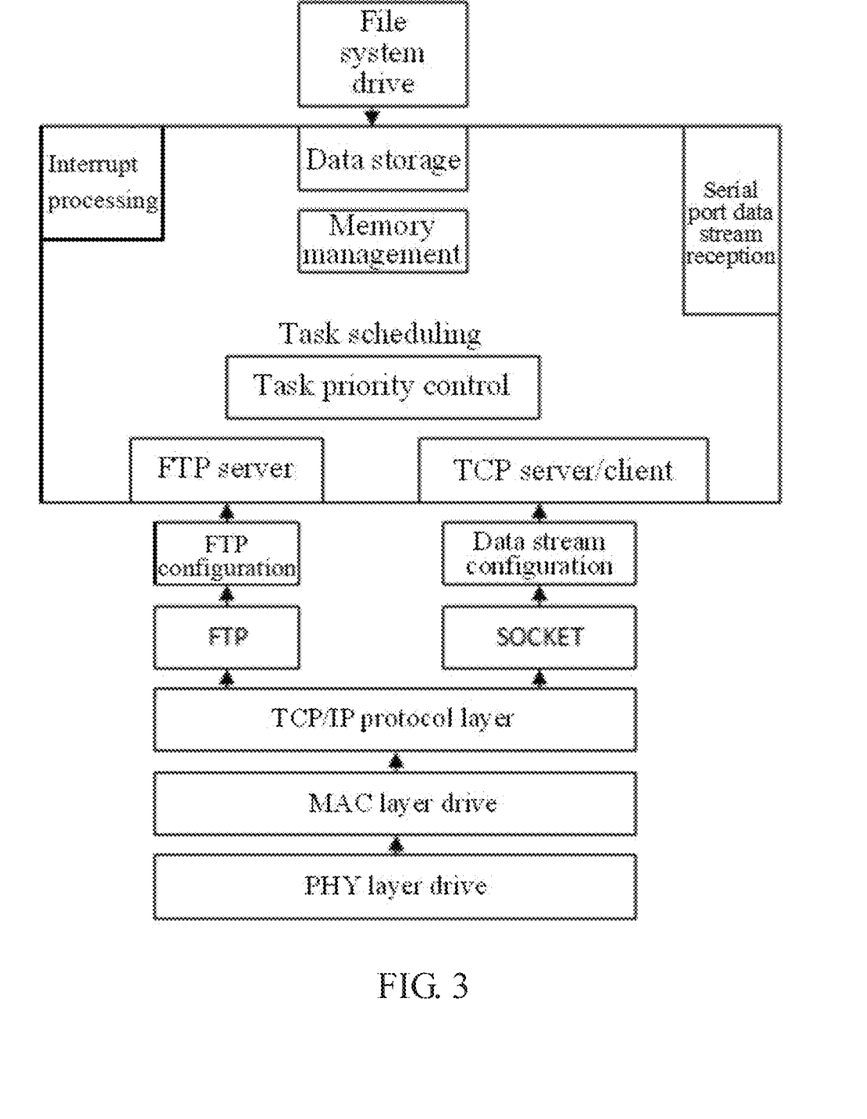
FIG. 3 is a schematic diagram illustrating the working principle of an embedded file network server based on a seismic data stream according to an embodiment of the present application.

FIG. 3 is a schematic diagram illustrating the working principle of an embedded file network server based on a seismic data stream according to an embodiment of the present application. The working principle of the embedded file network server based on the seismic data streams in this embodiment of the present application is specifically as follows.

In the first step, after the instrument is powered on, firstly, the PLL frequency multiplier 21 is started to perform frequency locking, so that the main frequency of the crystal oscillator 40 is locked to 96M. After the locking frequency stabilizes, the file system starts to be mounted, the file system of the SD card 60 is mounted as FAT32, and the USB drive is then initialized, so that it can receive any user USB drive request.

In the second step, start mounting the PHY bridge layer driver code of the network. After the mounting is completed, the MAC driver layer is initialized, and then the TCP/IP protocol layer is initialized. At the upper end, this protocol is divided into two parts. On the one hand, it mounts the file server of FTP (File Transfer Protocol), and connects the file server to the file system of the SD card. Then initialize the FTP configuration protocol, including two data ports and a communication port thereby completing the mounting of the FTP server. In addition, initialize TCP/IP-based TCP SERVER, initialize SOCKET flow, individually initialize the server with port 5000 and the client with port 8899, where the server can implement a custom data stream link, and the client can be used by the data network server.

In the third step, initialize the serial port data stream reception. The program includes the serial port baud rate initialization, serial port hardware pin configuration, and serial port data interrupt register configuration. The data stream initialization is completed. The SPI data stream accepts initialization, including configuration of the SPI control register, the SPI Data register, and the SPI hardware pin configuration, etc.

In the fourth step, allocate and process interrupt services. The interrupt services include capture interrupt (RRQ1) of detecting the PPS rising edge, serial data interrupt (RRQ2), SPI data interrupt (RRQ3), and network data interrupt (RRQ4). The interrupt priority is configured as RRQ1>RRQ2=RRQ3>RRQ4. RRQ2 and RRQ3 use concurrent processing, which can ensure the stability of data stream reception.

In the fifth step, start the common tasks priority scheduling algorithm. Its tasks include serial data stream to memory (SDRAM) (MSG1), SPI data stream to memory (MSG2), memory to SDIO file system (MSG3), memory to external network (MSG4), data stream protocol packaging (MSG5), and network disconnection management (MSG6), for the scheduling of these six common tasks, their order is MSG1>MSG2>MSG3>MSG4>MSG5>MSG6. Since the processing time of the six tasks from MSG1 to MSG6 is in the order of from less to more, and the time effectiveness is from high to low, using this scheduling algorithm in the main loop can not only ensure the time effectiveness of the data, but ensure the stability of the network packet sending.

The embedded file network server based on a seismic data stream according to the embodiments of the present application includes a main control unit and other peripheral unit modules. The seismic data stream is automatically converted into a file record and mapped as a remote network file server, or the data stream may be transmitted to the remote network server through a data link port. This application uses a simple interface and adopts a one-way communication mode, which can avoid the problem of protocol network access debugging. It can be embedded in various seismic collectors such as onshore seismic collectors or seabed seismic collectors to realize the conversion between data streams and remote network file servers or send the data streams to remote seismic network servers according to the network protocol, thus reducing the complexity of development of the seismic collectors, saving the time required for development, reducing user hardware costs, and achieving rapid network access for the equipment. In addition, while sending the data stream to the remote server, the data stream can be stored as a local file for data backup to ensure that the collected information can be saved to the maximum extent in case the main collection device fails.

The above description of the disclosed embodiments will enable those skilled in the art to implement or use this application. Various modifications to these embodiments will be apparent to those skilled in the art. The general principles defined in this application can be implemented in other embodiments without departing from the spirit or scope of this application. Therefore, the present application will not be limited to these embodiments illustrated in the present application. Rather, the widest scope consistent with the principles and novel features disclosed in the present application is claimed.

What is claimed is:

1. An embedded file network server based on a seismic data stream, comprising a broadband power management module, a main control unit, a serial-port-to-RS232 (Recommended Standard 232) module, a PHY (Physical) bridge layer, an SD (Secure Digital) card, and a network interface;

wherein one end of the broadband power management module is coupled to an external power supply, and another end of the broadband power management module is coupled to the main control unit, the broadband power management module being configured for rectifying and processing a power input to provide an electric level for the main control unit;

wherein the main control unit comprises a serial port, an SDIO (Secure Digital Input Output) interface, an internal RAM (Random-access memory), DMA (Direct Memory Access) units, and a MAC (Media Access Control) driver layer; the serial port is coupled to the serial-port-to-RS232 module; the internal RAM is coupled to the SDIO interface and the MAC driver layer through the DMA units, respectively; the SDIO interface is coupled to the SD card; the MAC driver layer is coupled to the PHY bridge layer; and the PHY bridge layer is coupled to the network interface;

wherein the main control unit is configured for performing seismic data interaction with an external device through the serial port, and receiving seismic data through an internal interruption, and the received seismic data stream is stored in the internal RAM; the internal RAM is configured for transferring the received seismic data stream to the SDIO interface and the MAC driver layer through the DMA units, and the SDIO interface is configured for storing the seismic data stream into the SD card for data backup; and the MAC driver layer is coupled to the PHY bridge layer for inputting and outputting the seismic data stream.

2. The embedded file network server as recited in claim 1, wherein the broadband power management module comprises built-in boost and buck modules, which use a CMOS (Complementary Metal Oxide Semiconductor) logic gate circuit; wherein in response to recognizing that an external power supply voltage is lower than a set voltage threshold, the CMOS logic gate circuit is turned off, and the boost module is started to step up the voltage, and in response to recognizing that the external power supply voltage is higher than the set voltage threshold, the CMOS logic gate circuit is turned on, and the buck module is activated to step down the voltage.

3. The embedded file network server as recited in claim 2, further comprising a crystal oscillator, and wherein the main control unit further comprises a PLL (Phase-locked Loop) frequency multiplier, which is coupled to the crystal oscillator and configured for performing a frequency multiplication operation on the crystal oscillator.

4. The embedded file network server as recited in claim 3, wherein the main control unit uses a cortex chip, the crystal oscillator uses a crystal oscillator with a main frequency of 22.288 m, and the PLL frequency multiplier performs a 8-fold frequency multiplication operation on the crystal oscillator, wherein the 96M main frequency is adopted after passing through the PLL frequency multiplier.

5. The embedded file network server as recited in claim 1, wherein the main control unit further comprises an SPI (Serial Peripheral Interface) interface, and wherein the serial port comprises a serial port configuration register, a serial port interrupt register, and a serial port data register, which are configured for flexibly configuring the serial port baud rate and receiving data in an interrupt mode; and the SPI interface comprises an SPI configuration register and an SPI data register, which are configured for a data reception and data streaming operation of the SPI.

6. The embedded file network server as recited in claim 5, wherein the SDIO interface performs data communication with the SD card through a four-wire mode to realize establishment and mounting of the SD card file system.

7. The embedded file network server as recited in claim 6, wherein the DMA units have a dual-channel DMA transmission capability to realize automatic trigger of multi-channel data transmission from the serial port to the SDIO unit, from the internal RAM to the MAC driver layer, and from the internal RAM to the SDIO unit, which comprises:

using a multi-channel DMA simultaneous trigger mode, which is divided into two DMA buses that do not interfere with each other from both sides of a AHB bus (Advanced High-Performance Bus), and in addition a DMA data stream from the serial port to SDIO is automatically triggered by the serial port register, and data migration is automatically realized after the trigger; the second DMA directly reaches the network MAC layer register from the MCU (Microcontroller unit) memory, and direction transmission is realized from the MAC layer register to the physical layer.

8. The embedded file network server as recited in claim 1, wherein the embedded file network server is built in with two sets of packaging protocol rules, which are operative to automatically identify a seismic network protocol; wherein in response to receiving a data stream interruption of the serial port, the serial port data is received during the interruption and processed according to different data stream formats, and is further packaged and transmitted depending on a registration status of each seismic collection server, thus transmitting the seismic data stream to the corresponding seismic collection server.

9. The embedded file network server as recited in claim 2, wherein the embedded file network server is built in with two sets of packaging protocol rules, which are operative to automatically identify a seismic network protocol; wherein in response to receiving a data stream interruption of the serial port, the serial port data is received during the interruption and processed according to different data stream formats, and is further packaged and transmitted depending on a registration status of each seismic collection server, thus transmitting the seismic data stream to the corresponding seismic collection server.

10. The embedded file network server as recited in claim 3, wherein the embedded file network server is built in with two sets of packaging protocol rules, which are operative to automatically identify a seismic network protocol; wherein in response to receiving a data stream interruption of the serial port, the serial port data is received during the interruption and processed according to different data stream formats, and is further packaged and transmitted depending on a registration status of each seismic collection server, thus transmitting the seismic data stream to the corresponding seismic collection server.

11. The embedded file network server as recited in claim 4, wherein the embedded file network server is built in with two sets of packaging protocol rules, which are operative to automatically identify a seismic network protocol; wherein in response to receiving a data stream interruption of the serial port, the serial port data is received during the interruption and processed according to different data stream formats, and is further packaged and transmitted depending on a registration status of each seismic collection server, thus transmitting the seismic data stream to the corresponding seismic collection server.

12. The embedded file network server as recited in claim 5, wherein the embedded file network server is built in with two sets of packaging protocol rules, which are operative to automatically identify a seismic network protocol; wherein in response to receiving a data stream interruption of the serial port, the serial port data is received during the interruption and processed according to different data stream formats, and is further packaged and transmitted depending on a registration status of each seismic collection server, thus transmitting the seismic data stream to the corresponding seismic collection server.

13. The embedded file network server as recited in claim 6, wherein the embedded file network server is built in with two sets of packaging protocol rules, which are operative to automatically identify a seismic network protocol; wherein in response to receiving a data stream interruption of the serial port, the serial port data is received during the interruption and processed according to different data stream formats, and is further packaged and transmitted depending on a registration status of each seismic collection server, thus transmitting the seismic data stream to the corresponding seismic collection server.

14. The embedded file network server as recited in claim 7, wherein the embedded file network server is built in with two sets of packaging protocol rules, which are operative to automatically identify a seismic network protocol; wherein in response to receiving a data stream interruption of the serial port, the serial port data is received during the interruption and processed according to different data stream formats, and is further packaged and transmitted depending on a registration status of each seismic collection server, thus transmitting the seismic data stream to the corresponding seismic collection server.

15. The embedded file network server as recited in claim 8, wherein the embedded file network server further comprises a built-in GPS (Global Positioning System) module, which uses a GPS-based real-time clock tame mechanism to accurately time and correct the internal clock, which comprises:
determining whether the GPS time is locked, and then using a GPS timing screening algorithm to perform PPS (Pulse per second) screening after the determination, and then timing an effective PPS after screening; and using a clock real-time correction algorithm to calibrate a crystal drift deviation in real time regarding a subsequent crystal drift phenomenon.

16. The embedded file network server as recited in claim 9, wherein the embedded file network server further comprises a built-in GPS module, which uses a GPS-based real-time clock tame mechanism to accurately time and correct the internal clock, which comprises:
determining whether the GPS time is locked, and then using a GPS timing screening algorithm to perform PPS screening after the determination, and then timing an effective PPS after screening; and using a clock real-time correction algorithm to calibrate a crystal drift deviation in real time regarding a subsequent crystal drift phenomenon.

17. The embedded file network server as recited in claim 10, wherein the embedded file network server further comprises a built-in GPS module, which uses a GPS-based real-time clock tame mechanism to accurately time and correct the internal clock, which comprises:
determining whether the GPS time is locked, and then using a GPS timing screening algorithm to perform PPS screening after the determination, and then timing an effective PPS after screening; and using a clock real-time correction algorithm to calibrate a crystal drift deviation in real time regarding a subsequent crystal drift phenomenon.

18. The embedded file network server as recited in claim 11, wherein the embedded file network server further comprises a built-in GPS module, which uses a GPS-based real-time clock tame mechanism to accurately time and correct the internal clock, which comprises:
determining whether the GPS time is locked, and then using a GPS timing screening algorithm to perform PPS screening after the determination, and then timing an effective PPS after screening; and using a clock real-time correction algorithm to calibrate a crystal drift deviation in real time regarding a subsequent crystal drift phenomenon.

19. The embedded file network server as recited in claim 12, wherein the embedded file network server further comprises a built-in GPS module, which uses a GPS-based real-time clock tame mechanism to accurately time and correct the internal clock, which comprises:
determining whether the GPS time is locked, and then using a GPS timing screening algorithm to perform PPS screening after the determination, and then timing an effective PPS after screening; and using a clock real-time correction algorithm to calibrate a crystal drift deviation in real time regarding a subsequent crystal drift phenomenon.

20. The embedded file network server as recited in claim 13, wherein the embedded file network server further comprises a built-in GPS module, which uses a GPS-based real-time clock tame mechanism to accurately time and correct the internal clock, which comprises:
determining whether the GPS time is locked, and then using a GPS timing screening algorithm to perform PPS screening after the determination, and then timing an effective PPS after screening; and using a clock real-time correction algorithm to calibrate a crystal drift deviation in real time regarding a subsequent crystal drift phenomenon.

\* \* \* \* \*